United States Patent [19]

Steinberg et al.

[11] Patent Number: 5,862,217
[45] Date of Patent: Jan. 19, 1999

[54] METHOD AND APPARATUS FOR IN-CAMERA ENCRYPTION

[75] Inventors: Eran Steinberg, San Francisco; Vasily Yeremenko, Santa Clara, both of Calif.

[73] Assignee: FotoNation, Inc., San Mateo, Calif.

[21] Appl. No.: 623,462

[22] Filed: Mar. 28, 1996

[51] Int. Cl.⁶ .................................................. H04N 7/167
[52] U.S. Cl. ............................... 380/10; 380/23; 380/18; 348/231; 348/233; 348/552
[58] Field of Search .................... 380/10, 18, 54, 380/23; 348/231, 233, 552

[56] References Cited

U.S. PATENT DOCUMENTS

| | | | |
|---|---|---|---|
| 4,776,013 | 10/1988 | Kafri et al. | 380/54 |
| 4,786,940 | 11/1988 | Daniele | 355/6 |
| 4,853,961 | 8/1989 | Pastor | 380/21 |
| 5,027,401 | 6/1991 | Soltesz | 380/54 |
| 5,159,630 | 10/1992 | Tseng et al. | 380/18 |
| 5,204,901 | 4/1993 | Hershey et al. | 380/21 |
| 5,233,653 | 8/1993 | Katsurabayashi | 380/18 |
| 5,297,202 | 3/1994 | Kapp et al. | 380/9 |
| 5,301,044 | 4/1994 | Wright | 358/500 |
| 5,303,370 | 4/1994 | Brosh et al. | 380/51 |
| 5,337,362 | 8/1994 | Gormish et al. | 380/54 |
| 5,384,846 | 1/1995 | Berson et al. | 380/23 |
| 5,410,642 | 4/1995 | Hakamatsuka et al. | 395/113 |
| 5,420,924 | 5/1995 | Berson et al. | 380/23 |
| 5,430,525 | 7/1995 | Ohta et al. | 355/201 |
| 5,468,581 | 11/1995 | Coe et al. | 430/22 |
| 5,499,294 | 3/1996 | Friedman | 380/10 |
| 5,581,613 | 12/1996 | Nagashima et al. | 380/10 |

*Primary Examiner*—Stephen C. Buczinski
*Attorney, Agent, or Firm*—David H. Jaffer

[57] ABSTRACT

A digital camera method and apparatus providing encryption of an image during the acquisition process, and therefore avoiding any stage wherein unencrypted image data exists. An encrypted password is generated. This is done either by a user and downloaded to the camera, or it is generated in the camera and displayed to the user. Inside the camera, an encryption generator is initialized upon reception and successful decryption of the password, whereupon light is admitted from an object to be photographed and converted to digital image data. The camera then performs a first encrypting operation on the digital image data to create temporarily encrypted image data. This encrypted data is saved temporarily, whereupon it is decrypted in increments and each increment processed to form processed image data. Each increment then undergoes a second and final encryption operation to create final encrypted image data which is stored in the camera for transmission to a computer. Alternatively to storing encrypted data temporarily, if the quantity of image data can be handled in one step it is processed directly and then encrypted and saved in camera storage. Therefore, at no stage in the image acquisition is there a point where image data is stored in unencrypted form from which unauthorized access might be obtained.

12 Claims, 5 Drawing Sheets

METHOD AND APPARATUS FOR IN-CAMERA ENCRYPTION

BACKGROUND OF THE INVENTION

1. Field of the Invention

The present invention relates generally to methods and apparatus for encrypting images, and more particularly to a method and apparatus for encrypting images in a camera as part of the image acquisition process.

2. Brief Description of the Prior Art

The use of encryption techniques to secure messages is well known in history. With modern data communications and storage devices often accessible by third parties, the securing of information is a problem receiving a great deal of attention. For example, in U.S. Pat. No. 5,159,630 by Tseng et al. a system for maintaining the security of information transmitted between facsimile machines is described wherein messages on paper are encrypted by the facsimile machine, transmitted in secure encrypted form and decrypted at the receiving end. U.S. Pat. No. 5,420,924 discloses a method of encryption using a scanner with digital technology to record an image and then sample and encrypt a portion of it for comparison with an image presented on an I.D. card.

In order to secure data transmission, the data is encoded on the sending end and decoded at the receiving end. This deters a third party from deciphering the message in route. Such a method is described in U.S. Pat. No. 5,233,653 by Katsurabayashi.

A method of securing payment documents is described in U.S. Pat. No. 5,297,202 wherein a document is signed by a customer and a copy of the signature is captured in digital form. Thereafter the signature is encrypted and saved along with a digital record of the transaction.

In addition to the above methods of achieving secured messages, signatures and I.D. cards, there is a need in the area of conventional digital photography. Images captured and stored by a digital camera on a PCMCIA card, or downloaded to a PC are subject to interception and viewing by unauthorized persons. Typically, a digital camera outputs digital image data to a PCMCIA card, disk, or through lines to a computer. The card or disk could be intercepted and the image viewed, or the data downloaded to a computer could be extracted prior to an encryption procedure. Newspaper reporters, investigators, etc. have a need to temporarily store photographic images in a way that is secure from unauthorized viewing. There is, therefore, a need for a camera that will provide encrypted, secure image data from the moment of image acquisition.

SUMMARY OF THE INVENTION

It is therefore an object of the present invention to provide a camera that encrypts photographic images.

It is a further object of the present invention to provide a camera which encrypts a photographic image in the process of image acquisition.

It is a still further object of the present invention to provide a camera that does not store or transfer an unencrypted image, even temporarily.

Briefly, a preferred embodiment of the present invention includes a digital camera method and apparatus providing encryption of an image during the acquisition process, and therefore avoiding any stage wherein unencrypted image data exists. An encrypted password is generated. This is done either by a user and downloaded to the camera, or it is generated in the camera and displayed to the user. Inside the camera, an encryption generator is initialized upon reception and successful decryption of the password, whereupon light is admitted from an object to be photographed and converted to digital image data. The camera then performs a first encrypting operation on the digital image data to create temporarily encrypted image data. This encrypted data is saved temporarily, whereupon it is decrypted in increments and each increment processed to form processed image data. Each increment then undergoes a second and final encryption operation to create final encrypted image data which is stored in the camera for transmission to a computer. As an alternative to storing the encrypted data temporarily, the camera can process it directly and then encrypt and save it in camera storage. At no stage in the image acquisition process is there a point where image data is stored in unencrypted form on a medium of a type from which unauthorized access can be obtained.

An advantage of the present invention is that it provides secure image encryption by performing the encryption as part of the image acquisition, whereas prior art systems allow a step where unencrypted images are readable.

A further advantage of the present invention is that in case of a malfunction of the system, any stored image data is encrypted and therefore unreadable.

A still further advantage of the present invention is a savings in processing time due to the elimination of the intermediate step of transporting unencrypted images to a computer for encryption.

IN THE DRAWINGS

DETAILED DESCRIPTION OF THE PREFERRED EMBODIMENT

Figure 1:
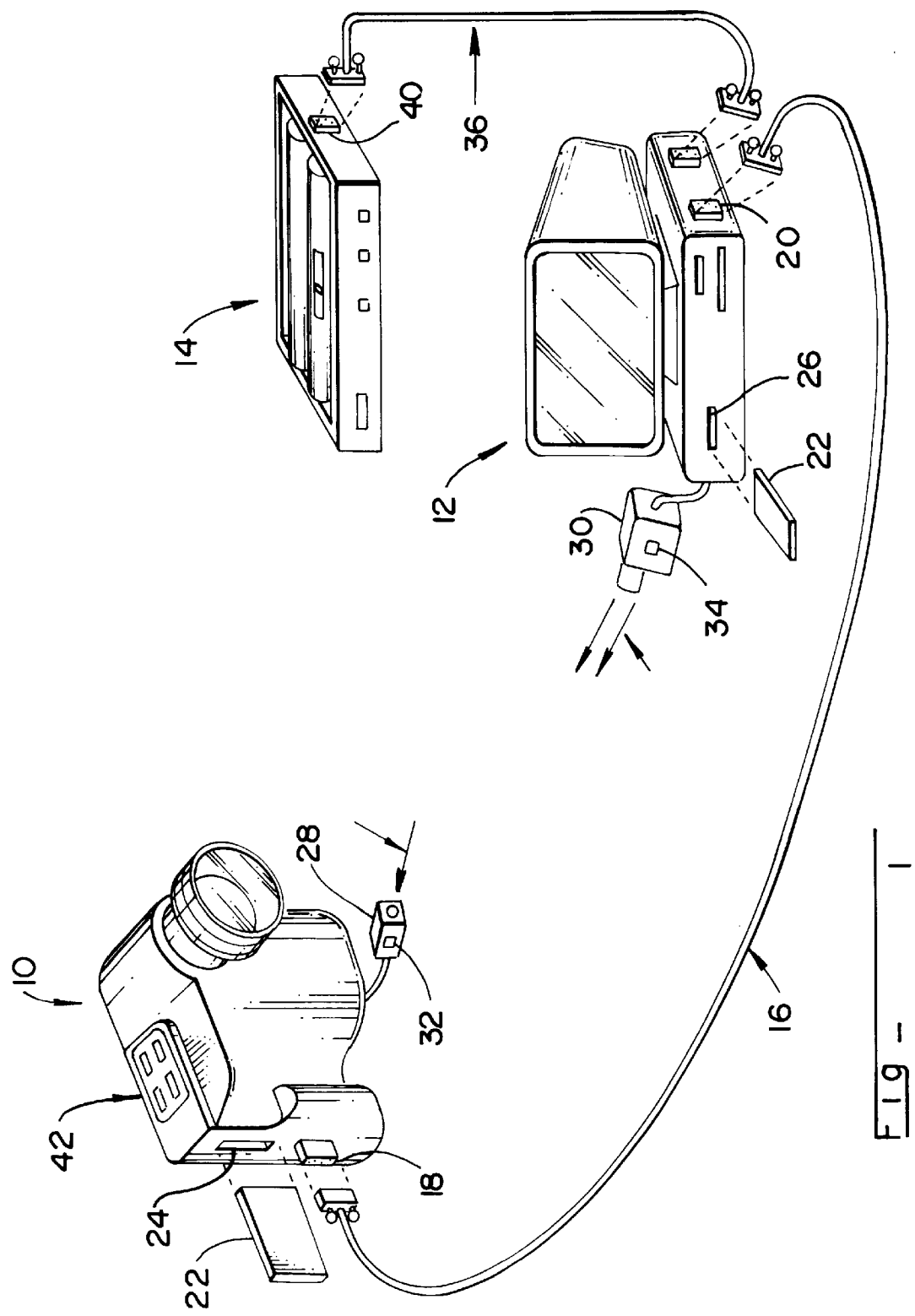
FIG. 1 illustrates the operation of a camera encryption system according to the present invention.

Referring now to FIG. 1 of the drawing, there is an illustration of the operation of a camera encryption system according to the present invention. There is a digital camera 10, a host computer 12 and a printer 14. A variety of means of communication between the camera 10 and computer 12 are shown including a cable assembly 16 interconnecting with the camera 10 and computer 12 through connectors 18 and 20. Communication can also be accomplished through use of a disk 22, such as a PCMCIA card for use with card/disk slots 24, 26. Radiated signals can also be used for communication as indicated by transceivers 28, 30. In addition, information can also be transferred through connections 32, 34 to a modem for transmission through a telephone system. The computer 12 is shown interconnected with the printer 14 by way of cable assembly 36 and connector 38, 40.

The camera 10 is constructed and configured for encrypting images as part of the image acquisition process. The process begins with either the user or camera 10 supplying a password, the choice being made by the user through operation of a camera control located, for example, on camera control and display 42. The operator can prepare the password in encrypted form through the use of the computer 12, the password then being downloaded to the camera through any of the communication methods described above. Alternatively, the user can choose from controls provided to have the camera 10 supply and display a password for example on the control and display 42.

In response to receiving an encrypted password, the camera 10 initializes an encryption generator, and then in response to user activation takes the picture. According to the present invention, the camera 10 then acquires an image and converts it to digital data. This data is then handled in one of two ways. One of these is to process it directly to create processed image data and thereafter encrypt it to form final encrypted image data. Alternatively, according to the preferred embodiment of the present invention, and providing enhanced security, the image data can undergo a first encryption to create temporarily encrypted image data which can be safely stored in the camera. This temporarily encrypted data is then extracted in increments, and each increment is decrypted and processed to form an increment of processed image data, which then undergoes a second and/or final encryption to form final encrypted image data. The advantage of this procedure is that when the raw data is initially encrypted prior to processing, there is no step in the camera process wherein any unencrypted data is stored, and therefore it is more secure against an unauthorized attempt to acquire the image data.

Following the camera image acquisition process, the final encrypted data is sent to the computer 12 by any of the means described above, whereupon the image can be viewed or printed (printer 14) upon user presentation of the password.

Figure 2:
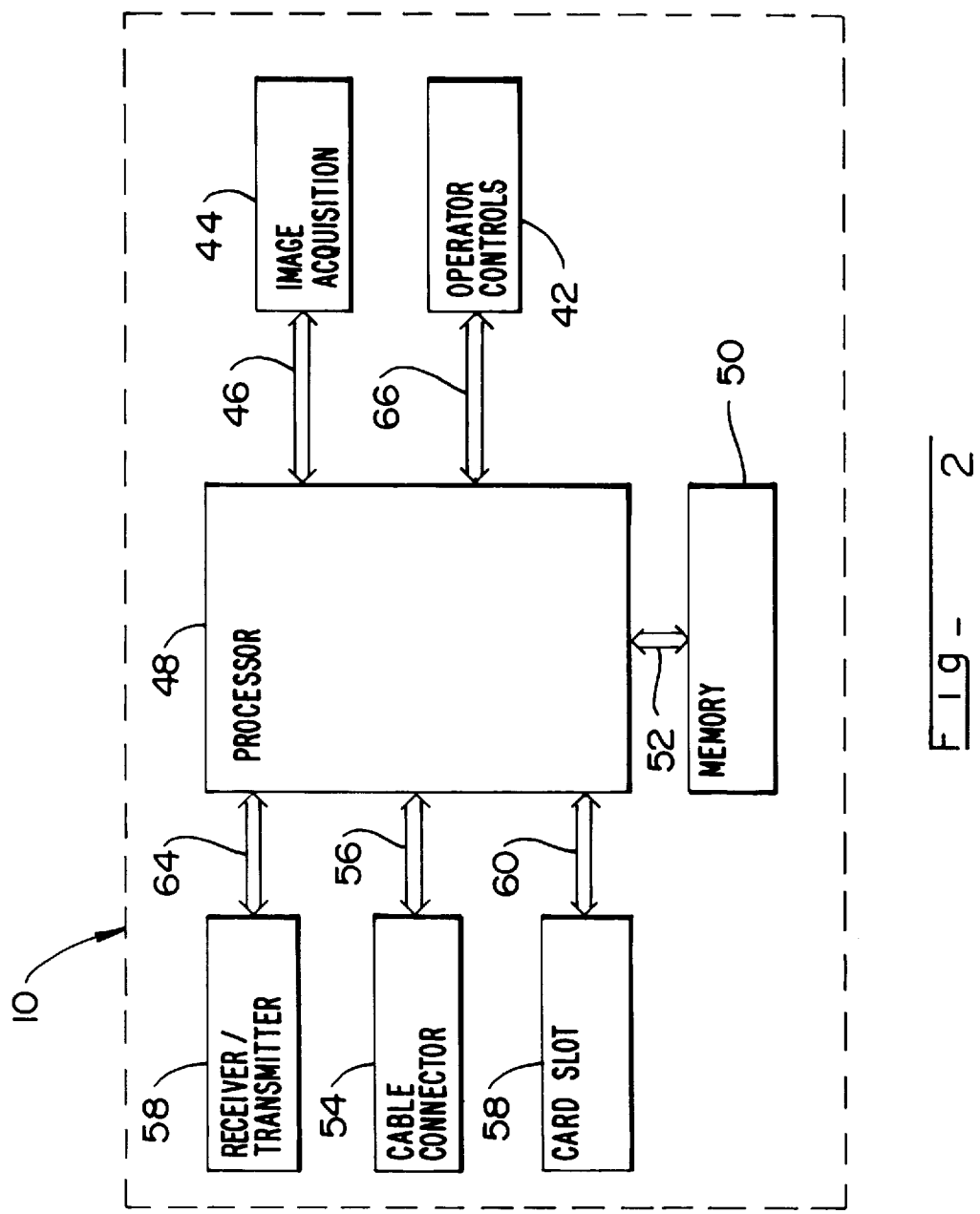
FIG. 2 is a block diagram showing the major components of a digital camera.

FIG. 2 shows a block diagram of the major operational portions of a digital camera. These include an image acquisition apparatus 44 in communication through bus 46 with a processor 48. The processor by way of bus 52, stores data in memory 50, which also includes memory for basic operations, the memory also referred to as an image buffer. Input and output of data is through one of the various means described above, including a cable connector 54 through bus 56, card/disk slot 58 through bus 60, transceiver 62 by way of bus 64, or modem connection (not shown in FIG. 2). Controls 42 are shown connected to the processor by way of bus 66.

The image acquisition apparatus 44 includes components well known by those skilled in the art and need not be shown in detail in order to practice the invention. The acquisition apparatus 44 includes an image optical pickup such as a charged coupled device (CCD) and A/D circuitry to convert the analog CCD signals to digital form for the processor 48.

Figure 3:
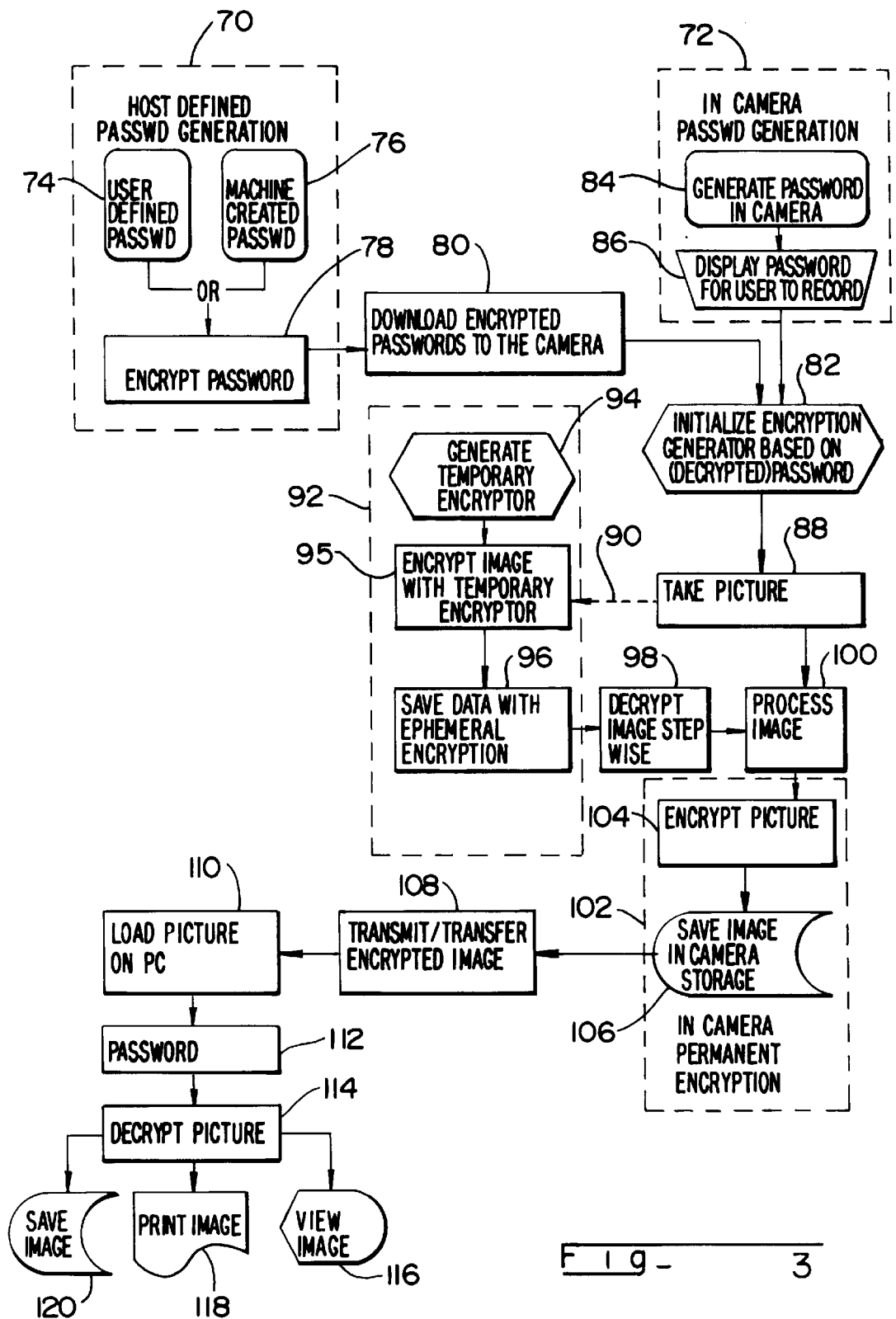
FIG. 3 is a block diagram describing the programmed operations of the digital camera encryption system of the present invention and its use with a host computer and printer.

Referring now to FIG. 3, an operational block diagram details the encryption process of the present invention. The blocks of FIG. 3 include the novel camera operations and the operations performed by the associated host computer system. Blocks 70 and 72 illustrate the two methods of determining the password described above. According to block 70, the operator creates a password through use of the host computer 12. This can be done either manually, the user providing the password (block 74), or the operator can instruct the host computer 12 to create a password (block 76). In either case, the host computer is programmed to encrypt the password (block 78) prior to downloading (block 80) to the first camera 10 operation (block 82). Alternatively, the camera 10 can provide the password, as indicated in block 72, beginning with the camera 10 generating a password 84 according to pre-programmed guidelines. The password is then displayed for the user to make record of and encrypted (block 86). The encrypted password is then sent to block 82. The above password encryption process describes and employs a single password for initializing the camera to take a picture and encrypt an image, as well as for decrypting the encrypted image at a later stage, such as in the host computer after the encrypted image data has been transferred to the computer. Another alternate password method is to use one password for encrypting the image, and another for decrypting it. A further alternative would be to not require a password at all for encryption, but only for decryption. Such would be the case in what is called a public/private key. These alternatives are included in the present invention.

The camera 10 operation of picture taking proceeds according to block 82 by decrypting the password, checking its validity and initializing/initiating the encryption process. If the password is correct, the picture is "taken" (block 88).

The camera functions of handling the password as described above are directed by the processor 48 in communication with the operator controls 42 and memory 50. The process of "taking" the picture (block 88) involves the image acquisition circuitry 44 as explained above. The processor 48 upon receipt of the digital image data can then proceed with the image processing and encrypting in one of the two ways according to the particular system programming or user selection. The choice of particular method of processing, i.e. the image data stored in unencrypted or encrypted form internal to the camera, is made by either hard wire in the camera or as an alternative, selectable through an operator control 42 on the camera.

If the greatest degree of security is required, the camera is programmed to proceed to provide a temporary encryption of the raw image data supplied by the image acquisition apparatus 44. This choice is indicated by arrow/path 90 and the temporary (ephemeral) encryption is performed according to block 92, beginning with the generation of a temporary encryptor or i.e. key, (block 94) which is processed with the raw data via line 90 to create temporary encrypted data (block 95) which is saved in memory 50 as indicated by block 96. This temporary or i.e. first encryption avoids the need to save unencrypted data, and provides added security in that there is no data storage from which an unauthorized user could extract unencrypted data even if the camera is in the possession of an unauthorized individual. The temporary saving of data (block 96) is needed when/if the processor 48 can not handle all of the incoming data immediately. The processor 48 then extracts the encrypted data in increments, each increment of data decrypted (block 98) and processed (block 100) to form processed image data.

The temporary encryptor of block 94 is initialized by an internal password. This password can be different from the password available to the operator as discussed above in reference to blocks 70, 72, and different from a password associated with block 112 to be described in the following specification in relation to decrypting image data at a host computer. The present invention includes an alternate embodiment wherein the internal password is different from the first password for encrypting or i.e., taking the picture, and different from a second password for decrypting the final encrypted image data, which can be the same password as or different from the first password. The programming according to the present invention includes the alternative of the camera randomly selecting an internal password, and also selecting a different internal password each time data is temporarily encrypted. This process makes it impossible for anyone to extract unencrypted data from internal camera storage.

Following the temporary encryption and/or processing of the image data, the processed image data then undergoes a second or i.e. final encryption and storage (block 102). Block 102 shows the second/final encryption (block 104), and saving of the final encrypted image data (block 106) in the camera memory, or removable external storage device 50. Upon user command through controls 42, the camera 10 transmits the final encrypted image data (block 108) to the host computer 12 (block 110). In order to use the image data, the password is presented by the user (block 112) and the data is decrypted (block 114). Again, the camera encryption programming can be done so that the password required at this point can be different from or the same as the password to encrypt. At this point the user can view the image 116, print the image 118, or/and save the image 120.

Figure 4:
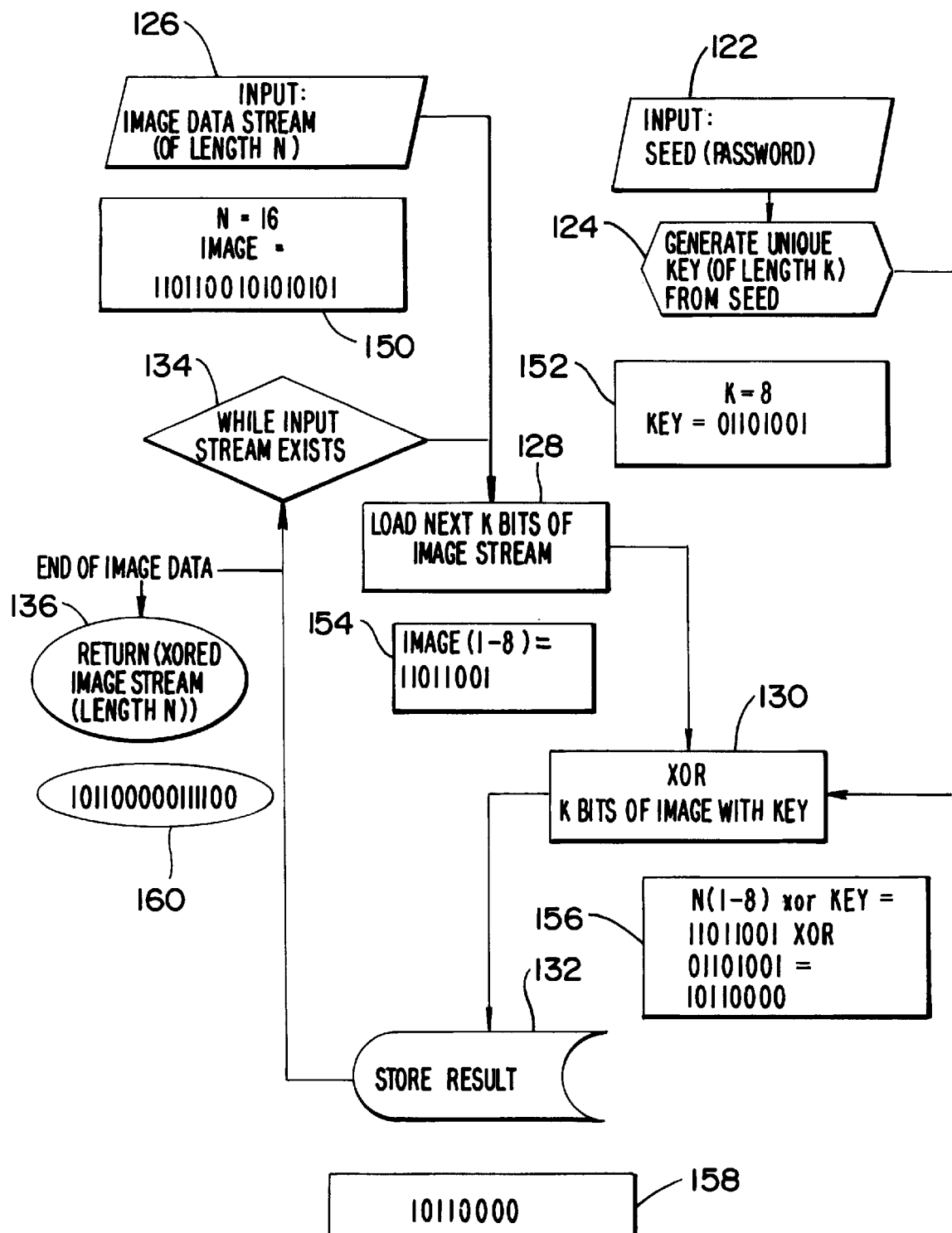
FIG. 4 is a block diagram detailing the steps involved in encrypting.
Figure 5A:
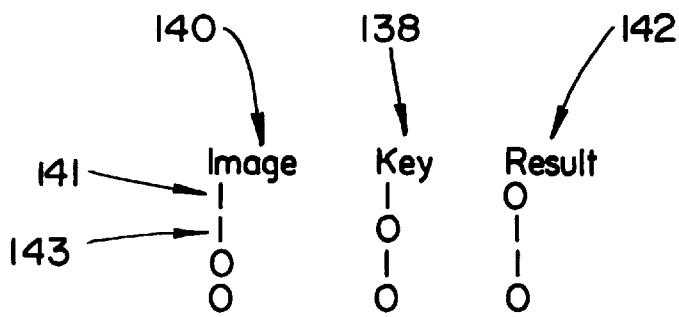
FIGS. 5A and 5B are tables with data illustrating a simple example of the basic concept of digital encryption.
Figure 5B:
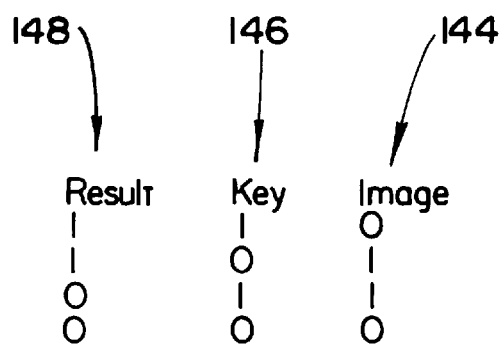

In order to clarify a process of digital encryption of data, a simplified example is now given with the assistance of FIGS. 4, 5A and 5B. To begin with, upon reception of a correct password (block 122) the processor 48 creates a key (block 124) of a predetermined length K. An input data stream (block 126) of length N is loaded K bits at a time (block 128) and exclusive OR'd (XOR'd) with the key (block 130). The result of the XOR block 130 is stored (block 132), and while the input stream lasts (block 134), another length of K bits is loaded (block 128). The XOR'd image stream is returned, i.e. stored as encrypted data in memory 50 (block 136).

FIGS. 5A and 5B illustrate a simple example of the processes of encryption and decryption using all possible combinations of the binary XOR operation. The key length in the example is K=4 and equal to 1010 (column 138). FIG. 5A shows the process of encryption. An image data stream is assumed to have an incremental length of 4 data bits equal to 1100 (column 140). The first row 141 shows a "1" bit of image data XOR'd with a "1" bit of the key to yield a "0" result because of the "exclusive OR" function. Similarly, "1" XOR'd with "0" results in "1", as does "0" XOR'd with "1", and "0" XOR'd with "0" in the next two rows yields "0", the results all shown entered in column 142. Similarly, FIG. 5B shows the process of decryption, the image data (column 144) being the encrypted "result" from FIG. 5A, which is XOR'd with the key (column 146) to yield the decrypted original data in column 148 which is exactly the same as column 140 in FIG. 5A as it should be.

Referring again to FIG. 4, a more lengthy example is given in blocks 150–160, where block 150 contains the input data stream and block 152 the key. Block 154 contains the first 8 bits of the stream in block 150 loaded according to block 128. Block 156 shows the first 8 bits XOR'd with the key of block 152. Block 158 indicates the first XOR'd/encrypted bits stored. Block 160 is the final encrypted complete data stream.

Although the use of an XOR function is described for encrypting, other functions or formulas can be used to transform/encrypt digital data from an original to a coded form, with the reverse process being performed for decryption. These various alternate functions and formulas are also included in the spirit of the present invention when used for in-camera encryption.

Although a preferred embodiment of the present invention has been described above, it will be appreciated that certain modifications or alternations thereon will be apparent to those skilled in the art. It is therefore requested that the appended claims be interpreted as covering all such alterations and modifications that fall within the true spirit and scope of the invention.

What is claimed is:

1. A method of secure processing and encryption of original digital image data in a digital camera system, comprising the steps of:
    (a) initializing an encryption generator in the camera through a user programmable encryption password;
    (b) converting light to original digital image data;
    (c) encrypting within said camera substantially all of said original digital image data, whereby the original digital image data is inaccessible from said camera in unencrypted form.

2. A method as recited in claim 1 wherein said encrypting includes the steps of:
    (a) first encrypting said original digital image data to temporarily encrypted image data;
    (b) saving said temporarily encrypted image data;
    (c) decrypting said temporarily encrypted image data to form decrypted image data;
    (d) processing said decrypted image data to form processed image data; and
    (e) second encrypting said processed image data to form said final encrypted image data,
    whereby the original digital image data is never accessible in unencrypted form.

3. A method as recited in claim 2 wherein
    a) said decrypting said temporarily encrypted image data includes decrypting incremental quantities of said temporarily encrypted image data to form quantities of incremental decrypted image data; and
    b) said processing said decrypted image data includes processing each of said quantities of incremental decrypted image data to form said processed image data.

4. A method as recited in claim 1 further comprising:
    a) receiving said password as an encrypted password from a source external to said camera; and
    b) decrypting said encrypted password to form said password.

5. A method as recited in claim 1 further comprising:
    a) saving said final encrypted image data; and
    b) transmitting said final encrypted image to a device external to said camera.

6. A method as recited in claim 2 further comprising:
    creating within said camera a randomly generated internal password required in order to accomplish said first encrypting and said decrypting said temporarily encrypted image data.

7. A camera for securely processing and encrypting original digital image data comprising:
    (e) an encryption generator in the camera, the generator being user programmable through a user selected encryption password;
    (b) means for converting light to original digital image data;
    (c) means for encrypting within said camera substantially all of said original digital image data, whereby the original digital image data is inaccessible from said camera in unencrypted form.

8. A camera as recited in claim 7 wherein said means for encrypting includes (a) means for first encrypting said original digital image data to temporarily encrypted image data;

(b) means for saving said temporarily encrypted image data;

(c) means for decrypting said temporarily encrypted image data to form decrypted image data;

(d) means for processing said decrypted image data to form processed image data; and (e) means for encrypting said processed image data to form said final encrypted image data, whereby the original digital image data is never accessible in unencrypted form.

9. A camera as recited in claim 8 wherein a) said means for decrypting said temporarily encrypted image data includes means for decrypting incremental quantities of said temporarily encrypted image data to form quantities of incremental decrypted image data; and b) said means for processing said decrypted image data includes means for processing each of said quantities of incremental decrypted image data to form said processed image data.

10. A camera as recited in claim 7 further comprising:

a) means for receiving said password as an encrypted password from a source external to said camera; and b) means for decrypting said encrypted password to form said password.

11. A camera as recited in claim 7 further comprising:

a) means for saving said final encrypted image data; and b) means for transmitting said final encrypted image to a device external to said camera.

12. A camera as recited in claim 8 further comprising:

means for creating within said camera a randomly generated internal password required in order to initiate said means for first encrypting and said means for decrypting said temporarily encrypted image data.

* * * * *